Sept. 14, 1937.  M. KATCHER  2,093,243
FRICTION CLUTCH
Filed Nov. 7, 1936   2 Sheets-Sheet 1
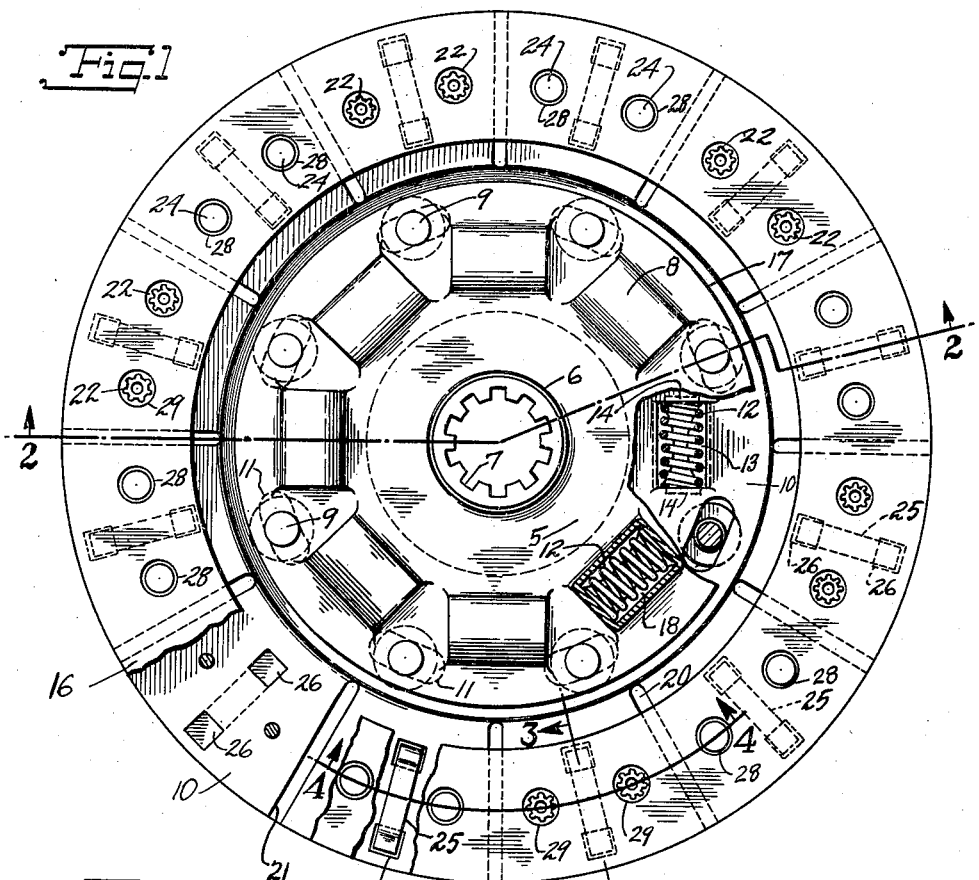
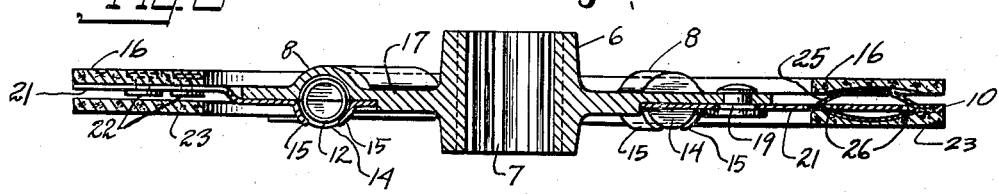
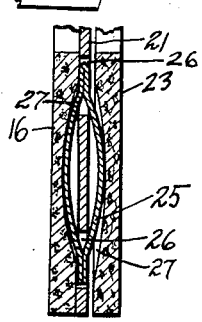
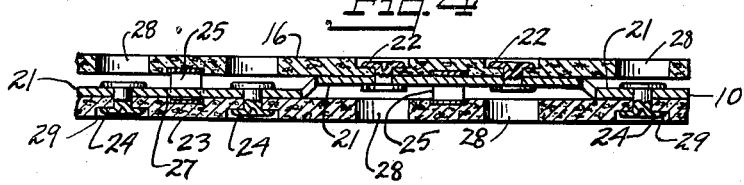
INVENTOR
Morris Katcher
BY
Emanuel Scheyer
ATTORNEY Sept. 14, 1937.                M. KATCHER                    2,093,243
                              FRICTION CLUTCH
                          Filed Nov. 7, 1936            2 Sheets-Sheet 2
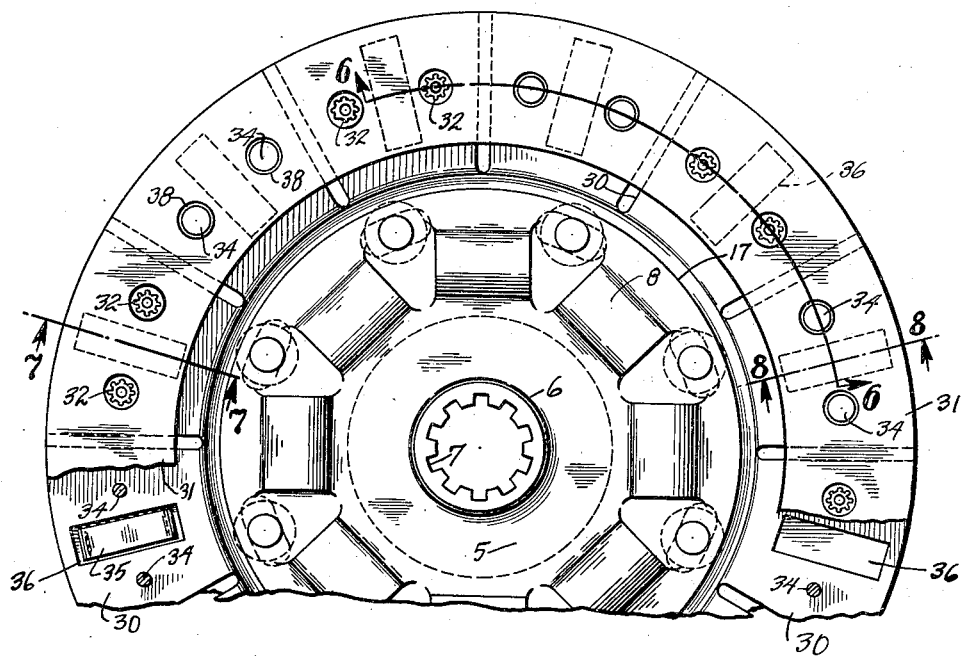
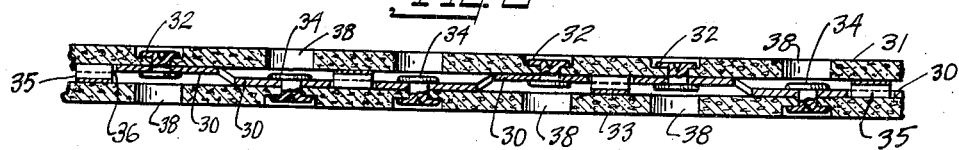
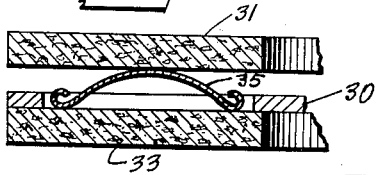
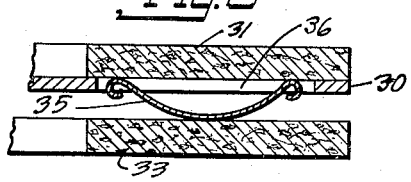
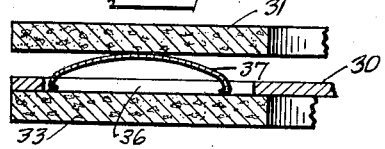
INVENTOR
Morris Katcher
BY
Emanuel Scheyer
ATTORNEY Patented Sept. 14, 1937

2,093,243

UNITED STATES PATENT OFFICE 2,093,243

FRICTION CLUTCH

Morris Katcher, New York, N. Y.

Application November 7, 1936, Serial No. 109,644

15 Claims. (Cl. 192—107)

This invention relates to a driven member for friction clutches of the kind wherein the driven member is interposed between two parts of a driving member and is adapted to be gripped or clamped by the parts under sufficient pressure to impart motion from the driving member to the driven member. The invention is particularly desirable in a friction clutch for automobiles.

An object of this invention is to provide means which shall be sufficiently yieldable to effect gradually the friction grip between the parts of the driving member and the friction facings of the driven member. This is effected by mounting the friction facings on the driven member with springs behind the facings which normally keep them away from the faces of said member. For increasing the gradual taking hold, the driven member is further constructed with two sets of spokes which are out of axial alignment with each other and fastening the friction facings each to one set of the spokes while the springs normally keep them away from the other set.

A further object of the present invention is the combination of the above means with provision in the driven member for cushioning between its parts. This combination will provide a clutch that will very efficiently take hold smoothly and evenly.

The construction of the driven member for providing cushioning between its parts forms the subject of my copending application Serial No. 70,748.

Other objects and advantages will become apparent upon a further study of the description and drawings, in which:—

Fig. 1 is an elevation of one side of the friction clutch member with portions of the hub spring housings and portions of the friction facing removed.

Fig. 2 is a section taken along the line 2—2 of Fig. 1.

Fig. 3 is a partial section to an enlarged scale taken along the line 3—3 of Fig. 1.

Fig. 4 is a partial section to an enlarged scale taken along the line 4—4 of Fig. 1.

Fig. 5 is a partial elevation of one side of a modified form of the friction clutch member with portions of the friction facing removed and one of the springs for holding one of the facings away from the driven member omitted at the right.

Fig. 6 is a partial section taken along the line 6—6 of Fig. 5.

Fig. 7 is a partial section to an enlarged scale taken along the line 7—7 of Fig. 5, Fig. 8 is a partial section to an enlarged scale taken along the line 8—8 of Fig. 5 and Fig. 9 is an enlarged section taken similarly to Fig. 7 showing a modified form of spring from that shown in Fig. 7.

As explained in my copending application, Serial No. 70,748, hub member 5 is provided with a hub 6, having keyways 7 for splining it to a shaft. The flange portion 17 of hub member 5 has a number of semi-cylindrical housings 8 pressed therefrom, which form a covering over openings in said flange portion, one of said openings being shown at 18. Attached to hub member 5 by means of shouldered rivets 9 is a plate member 10. Flange portion 17 of hub member 5 is provided with an annular recess into which extends the portion of plate member 10 that overlaps said hub. Each rivet 9 is fixedly attached to flange 17 which is gripped between the small head of the rivet and shoulder 19, Fig. 2. The shoulder 19 of each rivet 9 has a sliding fit in an elongated arcuate slot 11 concentric with the hub, and the large head of the rivet is slidable with respect to the surface of plate 10 adjacent the slot. The sliding of rivets 9 in elongated slots 11 permits of a limited relative rotation between hub member 5 and plate member 10.

The limited relative rotation between the hub and plate members, together with the springs 12, as will now be explained, provide a cushioning effect between the driving action of plate member 10 and hub member 5. The outer portion of plate member 10 is substantially in radial alignment with flange 17 of the hub member 5. The inner portion of plate member 10 is bent over from the outer portion so as to come adjacent one face of flange 17.

Plate member 10 is provided with a number of oblong openings 13 in which springs 12 are located. At the two short edges of each opening engaging the end of a spring 12 are lips 14. Along the long edges of the opening are curved lugs 15, preventing spring 12 from dropping through and out of friction plate 10. Housings 8 on hub member 5 hold springs 12 from passing through and out of said hub member. The flat end walls of housings 8 are equivalent to lips 14.

Radial slots 20 in plate member 10 produce a series of spokes 21 which alternate in position from substantially one face of flange 17 to substantially the other. In other words, the outer faces of alternate spokes 21 are out of radial alignment by substantially the thickness of flange 17. In Fig. 4, one spoke 21 is shown up and the adjacent one down, the spoke in the up position, as seen at the left hand side of Fig. 2 is substantially on line with that face of flange 17 from which housings 8 project. The spokes in down position in Fig. 2 are substantially on line with the opposite face of flange 17 from that noted in the preceding sentence. The position of the down spoke is also shown for the spoke at the right hand side of Fig. 2. Friction facing 16 is fastened to the top or outer face of up spokes 21 by means of rivets 22, while friction facing 23 is fastened to the bottom or outer face of down spokes 21 by means of rivets 24. The facings are fastened to their corresponding spokes by two rivets at each spoke and are held away from the spokes to which they are not fastened by means of elliptical springs 25. Each spring 25 is held in position on its spoke by being passed through openings 26 in the spoke, said spring passing through the openings at the ends of its major axis. Spring 25 is made of one piece of strip steel bent over an itself as clearly seen in Fig. 3. Friction facings 16 and 23 are provided with recesses 27 opposite springs 25. Friction facing 16 is provided with openings 28 opposite the inner heads of rivets 24 and friction facing 23 is provided with the openings 28 opposite the inner heads of rivets 22. Recesses 29 are provided in facings 16 and 23 extending inward from their outer faces. The outer heads of rivets 22 and 24 are sunk in said recesses.

As is well known to the art, facings 16 and 23 are squeezed between the driving plates of the clutch (not shown). As friction member 10 starts to rotate through the play provided by the sliding of rivets 9 in slots 11, springs 12 are pressed against by one of lips 14 and its adjacent edge of openings 13. The other end of said springs reacts against the opposite wall of housings 8 and its adjacent edge of openings 18 in hub member 5. Continued rotation of friction member 10 compresses springs 12 until they develop enough resistance to rotate hub member 5 along with said friction member. The inside radius of lugs 15 is the same as that of the inside radius of housing 8. This provides clearance for the spring when it swells under compression. When plate member 10 with its facings 16 and 23 is squeezed between the driving plates of the clutch, spokes 21 tend to be forced into radial alignment, and the facings are forced against the pressure of springs 25 against the spokes from which they are normally separated by said springs. The inner heads of rivets 22 and 24 then nest in openings 28.

The flexibility of spokes 21 and springs 25 slows down the speed of gripping of friction member 10 by the driving plates of the clutch, thus easing off the suddenness of starting of the driven member.

Figs. 5, 6, 7, and 8 show a modified form of springs and their mounting for normally keeping the friction facings away from the spokes of the friction member.

As explained above in connection with Figs. 1 to 4, spokes 30 are alternately out of radial alignment. As seen in Fig. 6, one spoke is shown up and the adjacent one down. Friction facing 31 is fastened to the up spokes by means of rivets 32, while friction facing 33 is fastened to the down spokes by means of rivets 34. The facings are fastened to their corresponding spokes by two rivets at each spoke and are held away from the spokes to which they are not fastened by shallow U shaped plate springs 35. Each spring is held in position on its spoke by being set in an opening 36 in the spoke.

The facing normally held away from any spoke is in contact with a spring 35 at the middle portion of the spring. Thus in Fig. 7, friction facing 31, which is fastened to the up spokes, is held away from the down spoke shown by spring 35, the legs of the spring being turned downward and setting in opening 36. In Fig. 8, friction facing 33, which is fastened to the down spokes, is held away from the up spoke shown by springs 35, the legs of the spring being turned upward and setting in opening 36. Springs 35 are curled at the edges.

In Fig. 9 another type of spring is shown. Here the legs of spring 37 contact the facing with slight inward curls at its ends.

Holes 38 are provided for the heads of rivets 32 and 34 to enter when the facings 31 and 33 are compressed.

I claim:—

1. A driven member for friction clutches having two sets of spokes, the spokes of a set being in substantially axial alignment with each other but out of axial alignment with the spokes of the other set, a pair of friction facings, one of said facings being located opposite one face of said spokes and the other facing being located opposite the other face of said spokes, a pair of rivets in each spoke of a set for holding its corresponding facing against the outer face of the spokes of the set, said rivets being unattached to the facing opposite the other face of the spokes, and a spring between the rivets of a pair for normally holding away from each spoke said latter facing.

2. A driven member for friction clutches having a friction facing fastened to one side of said member near its outer edge, and another friction facing fastened to the opposite side of said member near its outer edge, a set of rivets for fastening one of said facings to said member, another set of rivets for fastening the other of said facings to said member, the rivets of a set being located in pairs with substantially greater intervals between the pairs than between the rivets of a pair, the pairs of rivets of one set being between the pairs of rivets of the other set, the rivets of each set gripping its facing and the member without being fastened to the other facing, and a spring located between the rivets of each pair for normally holding away from said member the facing not held by the pair.

3. A driven member for friction clutches having a friction facing fastened to one side of said member at intervals, another friction facing fastened at spaced intervals to the opposite side of said member, and substantially elliptical springs located between said facings in said intervals and extending over each side of said member through openings in said member, a portion of said member coming inside each of said springs, for normally holding said facings away from said member.

4. A driven member for friction clutches having a friction facing fastened to one side of said member, another friction facing fastened to the opposite side of said member, a set of rivets in groups for fastening one of said facings to said member, another set of rivets in groups for fastening the other of said facings to said member, the groups of rivets of a set being located at intervals along its facing, the groups of the other set being between the groups of the first mentioned set, the rivets of each set gripping its facing and the member without being fastened to the other facing, and springs for each facing located between successive rivets of the groups of its set for normally holding the facing held by the other set away from said member.

5. A driven member for friction clutches as claimed in claim 4, in which the springs extend between the facings through openings in the member.

6. A driven member for friction clutches having a friction member, a friction facing fastened to one side of said member at intervals, another friction facing fastened to the opposite side of said member at intervals, and plate springs substantially elliptical in form located between said facings in said intervals for normally holding said facings away from said member, said springs each having the portion on one side of its major axis substantially on one side of said member and the portion on the other side of its major axis substantially on the other side of said member, the springs passing through openings in the member at each end of the major axis of the springs.

7. A driven member for friction clutches having a friction facing fastened to one side of said member, another facing fastened to the opposite side of said member, a set of fastening means in groups for fastening one of said facings to said member, another set of fastening means in groups for fastening the other of said facings to said member, the groups of fastening means of a set being located at intervals along its facing, the groups of the other set alternating with the groups of the former set, the fastening means of each set gripping its facing and the member without being fastened to the other facing, and plate springs for each facing, arcuate in form extending between said facings between successive fastening means of the groups of its set for normally holding the facing held by the other set away from said member, the central portions of said springs contacting said latter facing, said member having openings therein through which the springs extend.

8. A driven member for friction clutches having a friction facing fastened to one side of said member, another friction facing fastened to the opposite side of said member, a set of rivets for fastening one of said facings to said member, another set of rivets for fastening the other of said facings to said member, said rivets being located at spaced intervals along said facings, the rivets of each set gripping its facing and the member without being fastened to the other facing, and spring means for each facing located in said intervals and unattached to said rivets for normally holding the facings away from said member, the rivets of each set extending through its facing with heads on the side of said member adjacent the other facing, said other facing having its material removed opposite said rivet heads to accommodate them when the springs are compressed.

9. A driven member for friction clutches as claimed in claim 8 in which enough material of the facing is removed opposite the rivet heads to produce holes clear through the other facing.

10. A driven member for friction clutches having friction facings fastened to opposite sides of said member at intervals, means for fastening said facings to said member, and substantially elliptical springs contacting both facings in said intervals and extending over each side of said member through openings in said member, a portion of said member coming inside each of said springs for normally holding said facings away from said member, said facings being recessed on their insides to accommodate said springs.

11. A driven member for friction clutches having two sets of spokes, the spokes of a set being in substantially axial alignment with each other but out of axial alignment with the spokes of the other set, a friction facing mounted on the outer faces of the spokes of each set, a pair of fastening means upon each spoke for holding its corresponding facing against its outer face, said fastening means being unattached at each spoke to the facing opposite the inner face of the spoke, and a spring between the fastening means of each pair and unattached thereto, said spring extending through the spoke, for normally holding away from the inner face of each spoke said latter facing.

12. A driven member for friction clutches, friction facings arranged on opposite sides of said member, a set of fastening means in pairs for fastening one of said facings to said member, said means being unattached to the other facing, another set of fastening means in pairs for fastening the other of said facings to said member, said latter means being unattached to the first facing, the pairs of fastening means of one set alternating around said member with the pairs of fastening means of the other set, and a cushion member between each means of a pair and unattached thereto, for cushioning the facing unattached to said latter pair.

13. A driven member for friction clutches having friction facings fastened to opposite sides of said member and springs located at intervals along the inside of the facings for normally holding the facings away from said member, said facings being recessed on their insides to accommodate said springs.

14. A driven member for friction clutches having two sets of spokes, the spokes of a set being in substantially axial alignment with each other but out of axial alignment with the spokes of the other set, a friction facing fastened to each set, the facing fastened to one set being unattached to the other set, and springs located between the facings loosely mounted in the spokes for normally holding each facing away from the spokes of the set to which it is unattached.

15. A driven member for friction clutches comprising a disc having friction facings on each side of said disc and fastened to the disc, and springs located at intervals around the disc between the friction facings and the disc for normally holding the facings away from said disc, said facings being recessed on their insides to accommodate said springs.

MORRIS KATCHER.